US 10,528,380 B2

(12) United States Patent
Zelenov et al.

(10) Patent No.: US 10,528,380 B2
(45) Date of Patent: Jan. 7, 2020

(54) VIRTUAL MACHINE TO HOST COMMUNICATION CHANNEL

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 74 days.

(21) Appl. No.: 15/823,344

(22) Filed: Nov. 27, 2017

(65) Prior Publication Data
US 2019/0163509 A1 May 30, 2019

(51) Int. Cl.
*G06F 9/455* (2018.01)
*G06F 9/4401* (2018.01)

(52) U.S. Cl.
CPC ........ *G06F 9/45558* (2013.01); *G06F 9/4411* (2013.01); *G06F 2009/45579* (2013.01)

(58) Field of Classification Search
None
See application file for complete search history.

(56) References Cited

U.S. PATENT DOCUMENTS

| 8,464,254 | B1* | 6/2013 | Vohra | G06F 11/1458 718/1 |
| 2008/0256564 | A1* | 10/2008 | Fathalla | G06F 9/45537 719/331 |
| 2012/0297382 | A1* | 11/2012 | Kim | G06F 9/5077 718/1 |
| 2016/0371107 | A1* | 12/2016 | Puthillathe | G06F 9/45558 |
| 2018/0239715 | A1* | 8/2018 | Tsirkin | G06F 12/1081 |
| 2018/0260351 | A1* | 9/2018 | An | G06F 13/385 |

* cited by examiner

*Primary Examiner* — Wynuel S Aquino
(74) *Attorney, Agent, or Firm* — Lowenstein Sandler LLP

(57) ABSTRACT

A communication channel may be implemented from a host operating system (OS) to a guest OS of a virtual machine. The method may include receiving an instruction to create a communication channel between a guest OS of a virtual machine and host OS of a host computer system. The method may further include transmitting, to a virtual Universal Serial Bus (USB) hub executed by the host OS, a first request to create a virtual USB device on the virtual USB hub. The method may also include providing the virtual USB device to the guest OS and identifying an operation to be performed by the guest OS on the virtual USB device. The method may include providing, from the guest OS to the virtual USB hub of the host OS, a second request that includes the operation to be performed by the guest OS.

20 Claims, 5 Drawing Sheets

VIRTUAL MACHINE TO HOST COMMUNICATION CHANNEL

TECHNICAL FIELD

The present disclosure is generally related to virtualized computer systems, and is specifically related to a virtual machine to host communication channel.

BACKGROUND

Virtualization may be viewed as abstraction of hardware components into logical objects in order to allow a computer system to execute various software modules, for example, multiple operating systems, concurrently and in isolation from other software modules. Virtualization may be achieved by running a software layer, often referred to as a "virtual machine monitor" or "hypervisor," above the hardware and below the virtual machines. A hypervisor may abstract the physical layer and present this abstraction to virtual machines to use by providing interfaces between the underlying hardware and virtual devices of virtual machines. For example, processor virtualization may be implemented by the hypervisor scheduling time slots on one or more physical processors for a virtual machine rather than a virtual machine actually having a dedicated physical processor.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
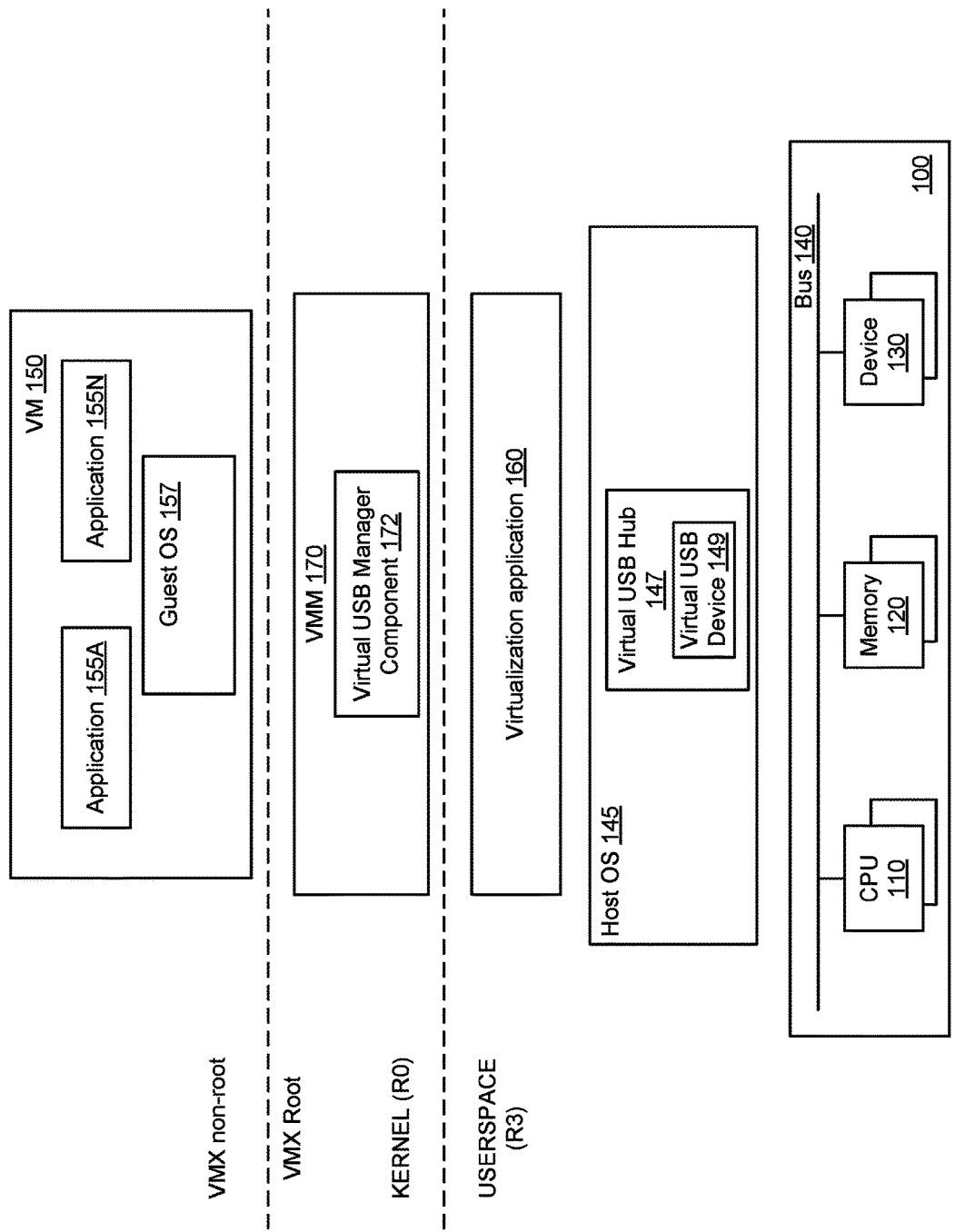
FIG. 1 depicts a high-level diagram of an example virtualized execution environment operating in accordance with one or more aspects of the present disclosure.

Described herein is a virtual machine to host communication channel. A communication channel may facilitate the communication between a host operating system (OS) of a host system and a guest OS of a virtual machine.

A virtual execution environment implemented by a host system may include a virtual machine monitor (VMM) facilitating execution of one or more virtual machines, each of which may run a guest OS to manage one or more guest applications.

Communications between a guest OS of a virtual machine and a host OS of the host system may be sent over a network of the host system. For example, an input received by the guest OS may be sent as a message to the host OS via a network of the host computing system. The message may then be received by the host OS from the network. However, sending communications from the guest OS to the host OS via a network of the host system may be problematic as the network may have firewalls, protocols or other restrictions that may prevent communication between the guest OS and the host OS. Additionally, the transmission of data and messages between the guest OS and the host OS via the network may consume bandwidth, decreasing the performance of the network and the host system.

Alternatively, communications between a guest OS of a virtual machine and the host OS of the host system may be sent through a serial and/or parallel port of the guest system. In an illustrative example, a virtual machine may create a virtualized abstraction of a serial port that may function as a direct connection (also referred to as "pipe" hereafter) between the virtual machine and an application of the host OS. For example, after the virtual machine creates the virtual serial port all instructions and operations to the virtual serial port may be redirected to the pipe. However, sending communications via the virtual serial port is a slow and inefficient process that utilizes a large amount of computing resources.

Accordingly, described herein are aspects of creating a communication channel between a guest OS and a host OS by creating a virtual Universal Serial Bus (USB) device to receive communications from the guest OS and provide the communications to the host OS using a virtual USB hub executed by the host OS. In an example, a processing device may receive an instruction to create a communication channel between a guest OS of a virtual machine and a host OS of a host system. The processing device may transmit, to a virtual USB hub executed by the host OS, a first request to create a virtual USB device on the virtual USB hub. The processing device may then provide the virtual USB device to the guest OS. The guest OS may receive an input for an operation to be performed by the guest OS on the virtual USB device. The processing device may identify the operation to be performed by the guest OS on the virtual USB device. After identifying the operation, the processing device may provide, from the guest OS to the virtual USB hub of the host OS, a second request comprising the operation to be performed by the guest OS.

According to aspects of the disclosure, the processing device may receive an indication that corresponds to an initiation of a virtual machine. The processing device may generate a virtual USB device on a virtual USB hub that is executed by a host OS in response to the initiation of the virtual machine. The processing device may transmit the virtual USB device to a guest OS of the virtual machine. Then, the processing device may intercept an instruction from the guest OS for the virtual USB device. After intercepting the instruction, the processing device may translate the instruction from the guest OS for the virtual USB device to a message for the host OS. The processing device may provide, from the guest OS via the virtual USB hub, the message to the host OS.

Thus, aspects of the present disclosure may be advantageous by providing a communication channel between a guest OS of a virtual machine and a host OS of a host system by using a virtual USB device. Communicating by using the virtual USB device prevents communications from being sent over a network of the host system, preventing interference from firewalls, protocols and restrictions while also conserving network bandwidth, thereby improving the performance of the host system. Additionally, communicating by using the virtual USB device prevents the use of virtual serial/parallel, increasing the speed of communications between the guest OS and the host OS and conserving computing resources of the host system.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced disclosure are described in details herein below by way of examples, rather than by way of limitation.

FIG. 1 depicts a high-level diagram of an example virtualized execution environment operating in accordance with one or more aspects of the present disclosure. The host system 100 may include one or more central processing units (CPU) 110, also referred to as "processing devices" herein, communicatively coupled to one or more memory devices 120 and one or more peripheral devices 130 via a system bus 140.

"Processing device" herein refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. A processing device may also be referred to as a central processing unit (CPU). "Memory device" herein refers to a volatile or non-volatile memory, such as random-access memory (RAM), read-only memory (ROM), electrically erasable programmable read-only memory (EEPROM), or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices. Certain peripheral devices, such as flash memory cards, compact disks, HDDs, or SSDs, may be hot-pluggable to the host system. Insertion of such a peripheral device into a suitable interface (e.g., a Universal Serial Bus (USB) socket) of the host system may trigger mounting the peripheral device by the host operating system (OS) 145. Mounting the peripheral device may involve identifying the device type, installing and/or activating an appropriate device driver, and initializing the peripheral device by the host OS via the device driver.

The computer system 100 may implement a virtual execution environment for executing the software developed for a platform that is different from the native platform of the host system 100. In certain implementations, the virtual execution environment may be implemented using certain hardware-assisted virtualization features of the processing device 110, which may support executing, at an elevated privilege level, a VMM 170 that manages one or more virtual machines. In various implementations, the VMM 170 may be implemented as a kernel module, a kernel extension, a driver, or a part of the host OS 145. The host OS 145 may further include a virtual USB hub 147 that virtualizes a USB hub to manage one or more virtual USB devices 149 for use by virtual machine 150 and/or host OS 145.

The VMM 170 may present a virtual machine 150 with an abstraction of one or more virtual processors, while retaining selective control of processor resources, physical memory, interrupt management, and input/output (I/O). The VMM 170 may also present a virtual machine 150 with an abstraction of one or more virtual USB devices 149 of the virtual USB hub 147. A virtual machine 150 may implement a software environment which may be represented by a stack including a guest operating system (OS) 157 and one or more applications 155A-155N. Each virtual machine 150 may operate independently of other virtual machines and use the VMM-facilitated interface to the processors, memory, storage, graphics, and I/O provided by the host platform 100. The VMM 170 may include a virtual USB management component 172 to receive instructions to create a communication channel between a host OS and a guest OS. The virtual USB management component 172 may also send a request to host OS 145 to create a virtual USB device and provide the virtual USB device to guest OS 157.

A transition from the VMM execution mode (also referred to as VMX root operation in certain processor architectures) to the guest execution mode (also referred to as VMX non-root operation) is referred to as a VM entry and may be performed by invoking a special Instruction Set Architecture (ISA)-dependent instruction (e.g., VMLAUNCH/VMRESUME or VMRUN instructions). The reverse transition, i.e., transition from the guest execution mode to the VMM execution mode is referred to as a VM exit and is initiated by the processing device in response to detecting one of the triggering events (such as an attempt to execute a certain privileged instruction or to access a certain memory address). Thus, when executed in the guest execution mode, certain instructions and events, instead of their ordinary operation, cause VM exits to the VMM 170. Because these VM exits modify the virtual processor's ordinary behavior, the functionality of software in the guest execution mode is limited by certain pre-configured restrictions for the code being executed. It is this very limitation that allows the VMM to retain the full control of processor resources and prevent the virtual machine from executing an operation that would corrupt the host state. Because the guest execution mode places restrictions even on software running on the virtual processor with the current privilege level (CPL) of zero, the guest software may run at the privilege level for which it was originally designed.

In the absence of hardware-assisted virtualization support by the processing device 110, binary translation may be implemented for translating instructions to be executed by the virtual machine 150 to the instruction set supported by the processing device 110 and/or for shifting the execution privilege levels in the guest execution mode.

In certain implementations, various virtual machine management functions (such as virtual machine creation, execution, and termination) may be performed by the virtualization application 160 running in a non-privileged execution mode in the user space of the host system 100. The virtualization application 160 may include a separate processing thread for each virtual processor (VCPU) of the virtual machine(s) 150. Within each thread, the virtualization application 160 may invoke the functions of the VMM 170 for performing the platform emulation or getting access to the run-time data of the virtual machine(s) 150. In certain implementations, the virtualization application 160 may further implement a GUI intercepting user input and displaying graphical output generated by the virtual machine.

Certain instructions executed and/or certain events occurring in the guest execution mode may cause VM exits, which are processed by the VMM 170, which may pass the VM exit reason and other relevant information to the virtualization application 160, which thus exercises control over the execution of the virtual machine 150.

Figure 2:
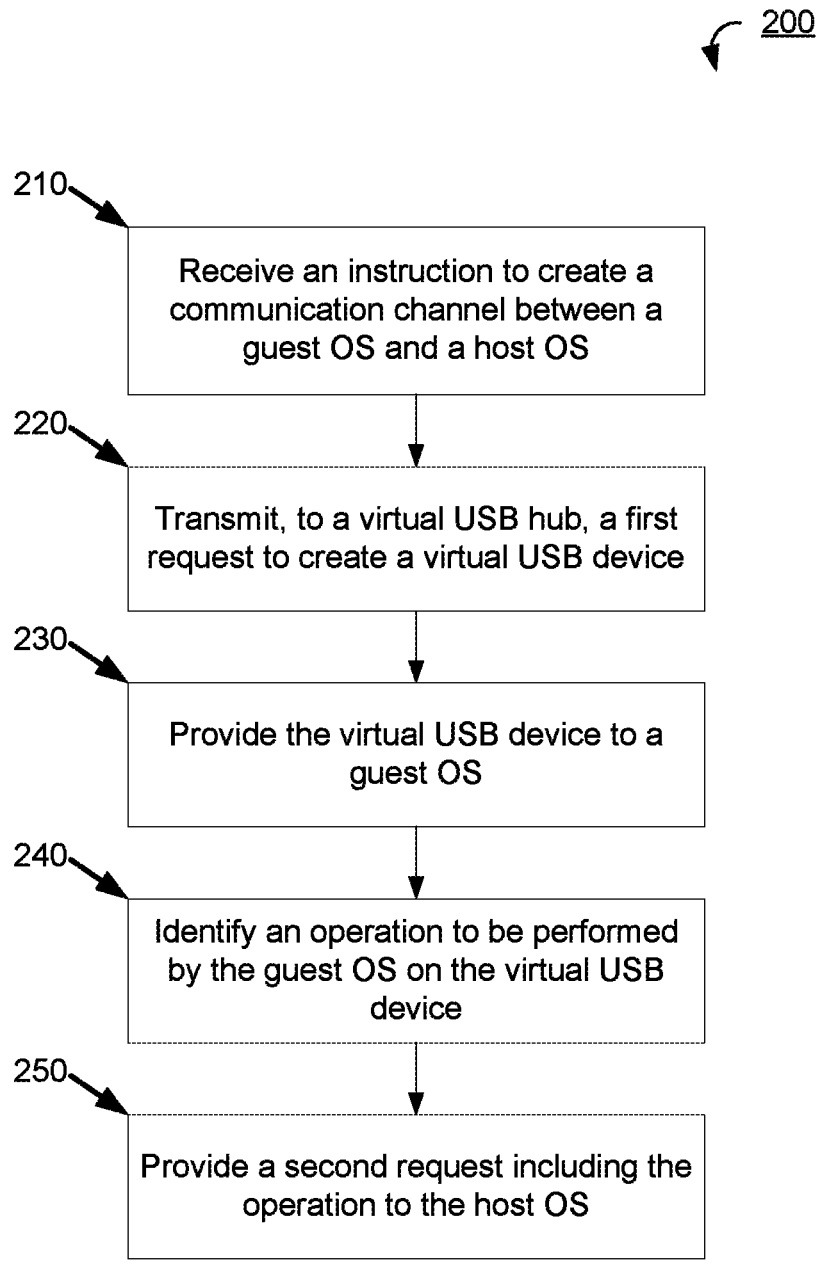
FIG. 2 depicts a flow diagram of one illustrative example method of creating a communication channel between a host operating system (OS) and a guest OS in accordance with one or more aspects of the present disclosure.

FIG. 2 depicts a flow diagram of one illustrative example of a method 200 of creating a communication channel between a host OS and a guest OS. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 200 may be performed by virtual USB manager component 172 of FIG. 1.

At block 210, a processing device may receive an instruction to create a communication channel between a guest OS of a virtual machine and a host OS of a host system. For example, a guest OS of a virtual machine may send an instruction to the VMM of the host system to create a communication channel. In one implementation, the host system may transmit an instruction to the VMM to create a communication channel with the guest OS of a virtual machine. At block 220, the processing device may transmit, to a virtual USB hub executed by the host OS, a first request to create a virtual USB device on the virtual USB hub in response to receiving the instruction at block 210. Subsequent to receiving the first request, the processing device may create the virtual USB device on the virtual USB hub. In one implementation, the processing device may create a virtual driver for the virtual USB device. The virtual driver may include an additional application programming interface (API) that allows the virtual USB device to respond to instructions and requests from the guest OS, as will be discussed in more detail at block 240 below. In other implementations, the virtual USB device may be a standard USB device, such as a camera or flash drive, and a virtual driver may not be created. In implementations where the virtual USB device may be a standard USB device, the processing device may create at least one of a vendor identification, device identification or descriptor that corresponds to the virtual USB device. In some implementations, the virtual USB device may be created by the host OS.

At block 230, the processing device may provide the virtual USB device to the guest OS. In one implementation, the processing device may provide the virtual driver for the virtual USB device to the guest OS. Providing the virtual driver to the guest OS may also facilitate the installation of the virtual driver on the guest OS. For example, when the processing device provides the virtual driver to the guest OS it may also provide an instruction to the guest OS to install the virtual driver on the guest OS. In another implementation, the virtual USB device may be a standard virtual USB device. The processing device may then provide at least one of the created vendor identification, device identification or descriptor that corresponds to the standard virtual USB device. For example, the processing device may provide a device identification that identifies the virtual USB device as a camera. Providing the at least one of the vendor identification, device identification or descriptor to the guest OS may allow the guest OS to access the standard virtual USB device. In some implementations, the guest OS may use the at least one of the vendor identification, device identification or descriptor to find virtual USB device information in a database and install a corresponding driver.

At block 240, the processing device may identify an operation to be performed by the guest OS on the virtual USB device. The guest OS may perform the operation in response to receiving an input from a user of the guest OS via one or more applications (e.g., Applications 155A-155N) executed by virtual machine 150. For example, the guest OS may receive an input from the user that instructs the guest OS to perform a write operation on the virtual USB device. In one implementation, the operation may be a read operation to read data from the virtual USB device. In another implementation, the operation may be a write operation to write data to the virtual USB device. In implementations, the operation may be a device input and output control that provides control codes to the virtual USB device. At block 250, the processing device may provide a second request to the host OS that includes the operation to be performed by the guest OS. For example, the second request may be provided to the host OS from the guest OS and may include a write operation to be performed on the virtual USB device by the guest OS.

Figure 3:
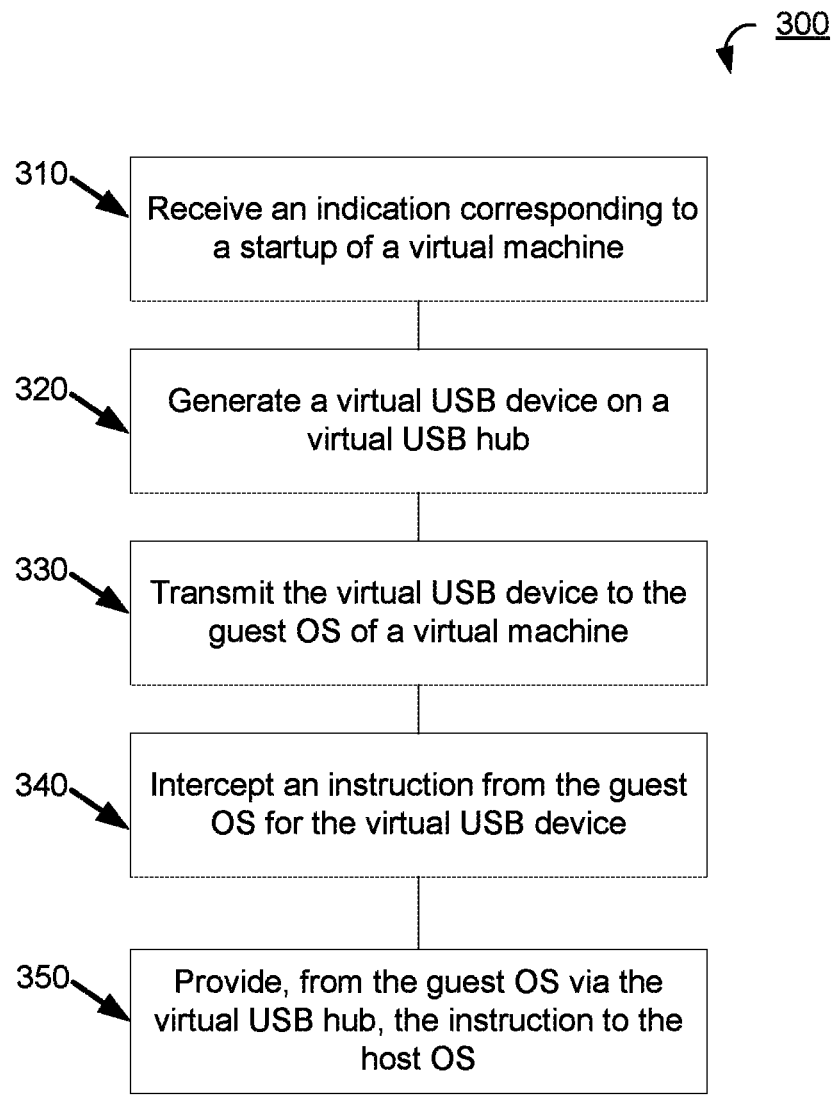
FIG. 3 depicts a flow diagram of one illustrative example method of creating a communication channel between a host OS and a guest OS in response to an initiation of a virtual machine in accordance with one or more aspects of the present disclosure.

FIG. 3 depicts a flow diagram of one illustrative example of method 300 of creating a communication channel between a host OS and a guest OS in response to an initiation of a virtual machine, in accordance with one or more aspects of the present disclosure. The method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 300 may be performed by virtual USB management component 172 of FIG. 1.

At block 310, the processing device may receive an indication that corresponds to an initiation of a virtual machine. For example, the processing device may receive an indication that corresponds to a new virtual machine being launched on the host system. At block 320, the processing device may generate a virtual USB device on a virtual USB hub executed by a host OS of the host computer system in response to the initiation of the virtual machine of the indication received at block 310. For example, in response to the initiation of the virtual machine, the processing device may generate a virtual USB device that corresponds to a flash drive. In one implementation, the processing device may generate a virtual driver for the virtual USB device. In other implementations, the processing device may be a standard USB device, such as a camera or flash drive, and a virtual driver may not be created. In implementations where the virtual USB device may be a standard USB device, the processing device may create at least one of a vendor identification, device identification or descriptor that corresponds to the virtual USB device. In some implementations, the virtual USB device may be generated by the host OS.

At block 330, the processing device may transmit the virtual USB device to a guest OS of the virtual machine that was initiated at block 320. In one implementation, the processing device may transmit the virtual driver for the virtual USB device to the guest OS. Transmitting the virtual driver to the guest OS may also facilitate the installation of the virtual driver on the guest OS. For example, when the processing device transmits the virtual driver to the guest OS it may also provide an instruction to the guest OS to install the virtual driver on the guest OS. In another implementation, the virtual USB device may be a standard virtual USB device. Then, the processing device may transmit at least one of the created vendor identification, device identification or descriptor that corresponds to the standard virtual USB device. For example, the processing device may provide a device identification that identifies the virtual USB device as a flash drive. Transmitting the at least one of the vendor identification, device identification or descriptor to the guest OS may allow the guest OS to access the standard virtual USB device.

At block 340, the processing device may intercept an instruction from the guest OS for the virtual USB device created at block 320. The processing device may intercept the instruction from the guest OS by identifying that the guest OS is to perform an operation on the virtual USB device. For example, when the guest OS is to perform a write operation on the virtual USB drive, the processing device may identify than an instruction from the guest OS is for the virtual USB device and intercept the instruction. In one implementation, the instruction may be read operation to read data from the virtual USB device. In another implementation, the instruction may be a write operation to write data to the virtual USB device. In implementations, the instruction may be a device input and output control that provides control codes to the virtual USB device.

At block 350, the processing device may provide the instruction from the guest OS for the virtual USB device that was intercepted at block 340 to the host OS. For example, the instruction may be provided to the host OS from the guest OS and may include a write operation to be performed on the virtual USB device by the guest OS. In one implementation, the processing device may translate the instruction from the guest OS to a message that is readable by the host OS. For example, if the guest OS uses a first programming language and the host OS uses a second programming language, then the processing device may translate the instruction from the guest OS that is in the first programming language into a message for the host OS that is in the second programming language.

Figure 4:
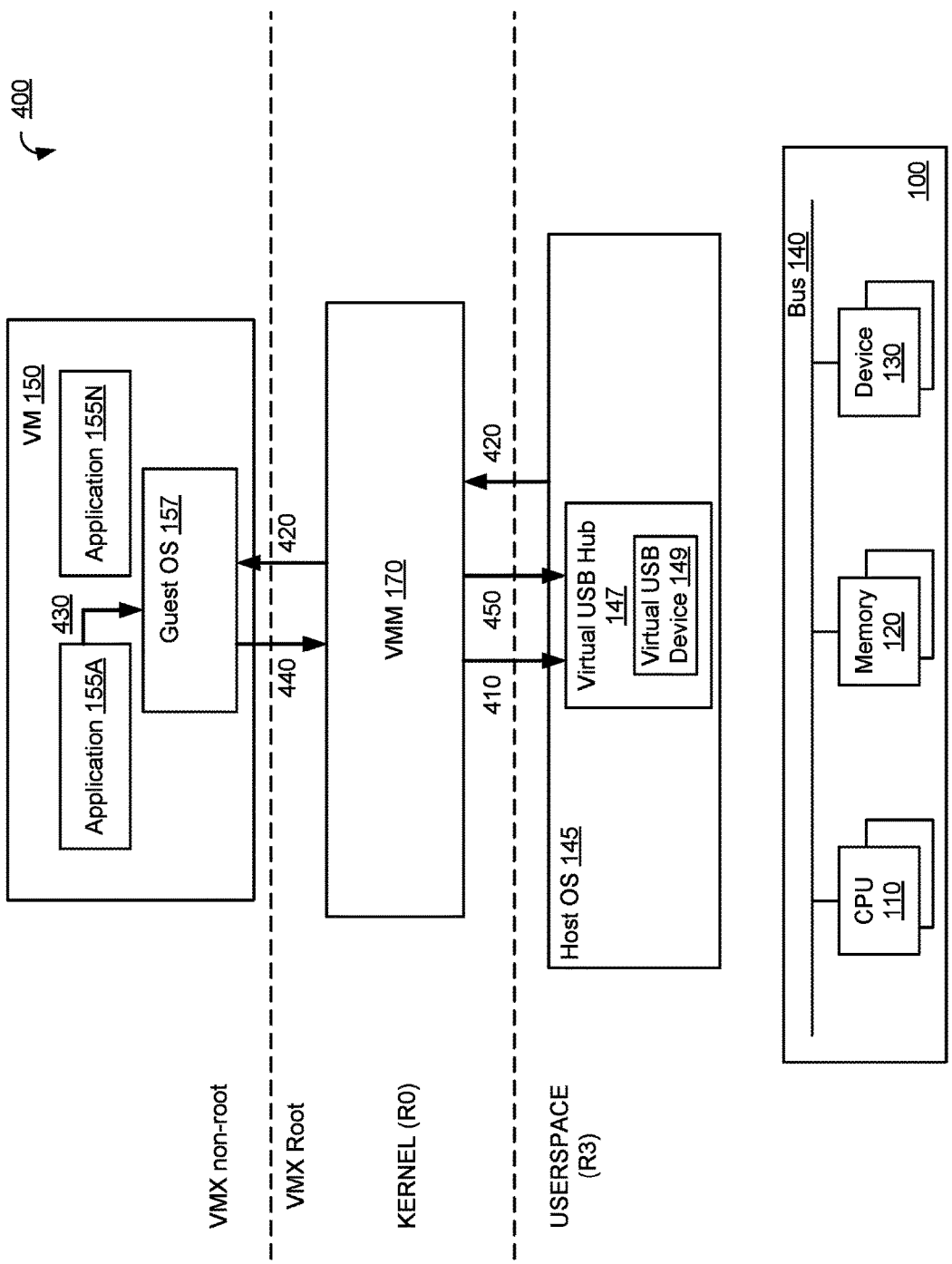
FIG. 4 is an illustration of a computing system creating a communication channel between a host OS and a guest OS according to implementations of the present disclosure.

FIG. 4 is an illustration of a computing system 400 creating a communication channel between a host OS and a guest OS. Prior to creating a communication channel, VMM 170 may receive an instruction to create a communication channel between guest OS 157 and host OS 145. In some implementations, VMM 170 may receive an indication that corresponds to an initiation of virtual machine 150. VMM 170 may then transmit, to virtual USB hub 147 executed by the host OS 145, a first request 410 to create a virtual USB device 149 on the virtual USB hub 147. After receiving the first request 410, the host OS 145 may create virtual USB device 149 on the virtual USB hub 147. After virtual USB device 149 has been created, the host OS may provide parameters 420 of the virtual USB device 149 to the VMM 170. In one implementation, the parameters 420 may include a virtual driver for the virtual USB device 149. In other implementations, the parameters 420 may include at least one of a vendor identification, device identification or descriptor for the virtual USB device 149.

After receiving the parameters 420, the VMM 170 may provide the parameters 420 to the guest OS 157. In one implementation, providing the parameters 420 may facilitate the installation of the virtual driver on the guest OS 157. In some implementations, providing the parameters 420 may allow the guest OS 157 and applications 155A-155N of guest OS 157 to access the virtual USB device 149. An input 430 may be received by the guest OS 157 from application 155A that corresponds to an operation to be performed on the virtual USB device 149. For example, input 430 may be a user input from application 155A instructing guest OS 157 to perform a write operation on virtual USB device 149. After receiving input 430, guest OS 157 may attempt to perform the operation 440 on the virtual USB device 149. VMM 170 may identify that operation 440 is to be performed on the virtual USB device 149 and intercept the operation. In one implementation, after intercepting the operation 440, VMM 170 may translate the operation 440 to a message 450 and provide the message 450 to the host OS 145 via the virtual USB hub 147.

Figure 5:
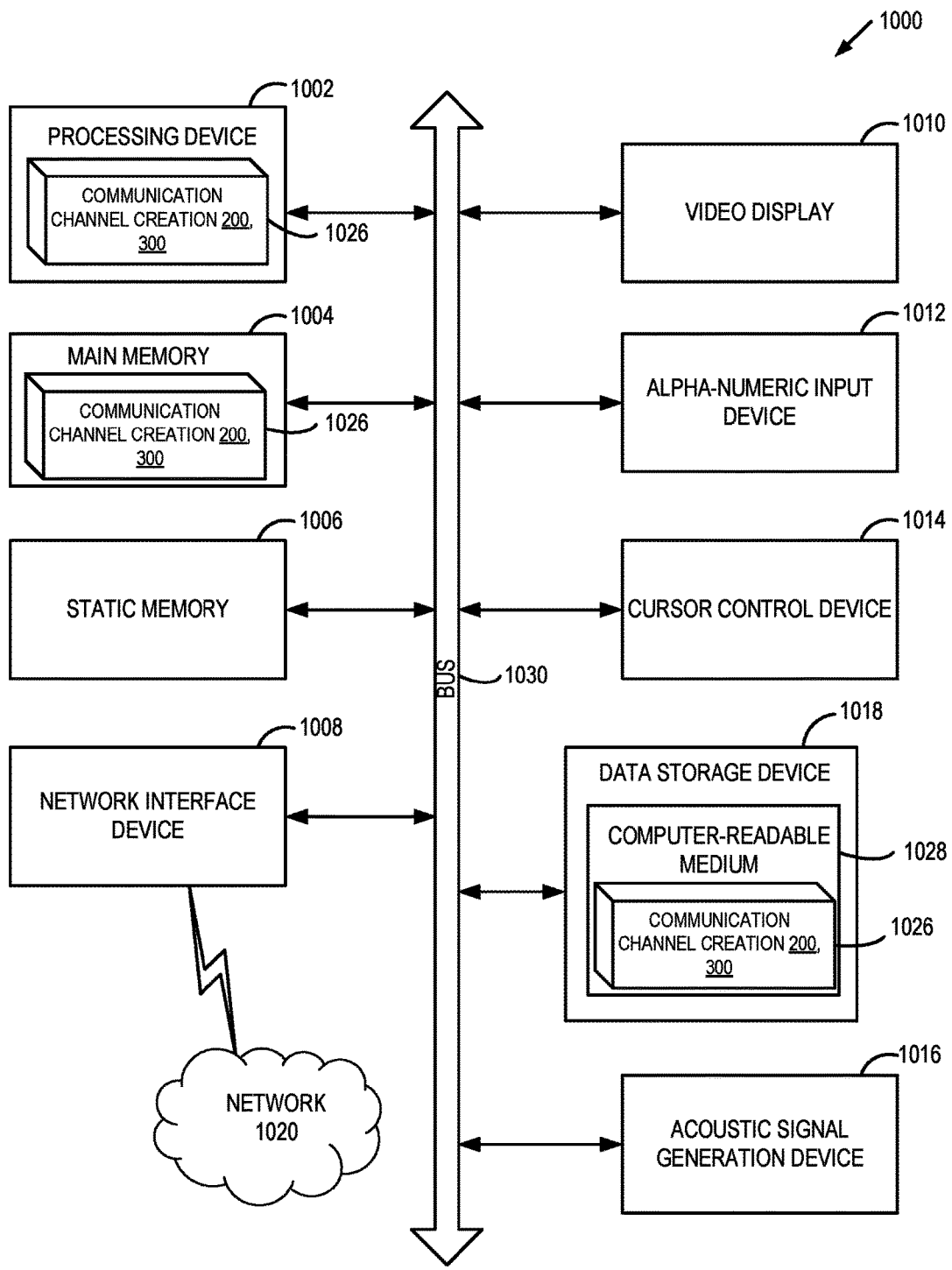
FIG. 5 schematically illustrates a component diagram of an example computer system which may perform any one or more of the methods described herein.

FIG. 5 schematically illustrates a component diagram of an example computer system 1000 which may perform any one or more of the methods described herein. In various illustrative examples, computer system 1000 may represent example computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing methods 200, 300 of creating a communication channel from a host OS to a guest OS.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of virtual USB management component 172.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   receiving an instruction to create a communication channel between a guest operating system (OS) of a virtual machine and a host OS of a host system;
   in response to receiving the instruction to create the communication channel, transmitting, to a virtual Universal Serial Bus (USB) hub executed by the host OS, a first request to create a virtual USB device on the virtual USB hub;
   providing the virtual USB device to the guest OS;
   identifying, by a processing device, an operation to be performed by the guest OS on the virtual USB device;
   causing a second request, comprising the operation to be performed by the guest OS, to be provided from the guest OS to the virtual USB hub; and
   causing the second request to be provided from the virtual USB hub to the host OS.

2. The method of claim 1, wherein the transmitting the first request to create the virtual USB device further comprises:
   transmitting the first request to create a virtual driver for the virtual USB device; and
   providing the virtual driver for the virtual USB device to the guest OS.

3. The method of claim 2, wherein providing the virtual driver to the guest OS facilitates an installation of the virtual driver on the guest OS.

4. The method of claim 1, wherein the processing device executes a virtual machine manager.

5. The method of claim 1, wherein the operation to be performed by the guest OS on the virtual USB device comprises at least one of a read operation, a write operation or an input/output control operation.

6. The method of claim 1, wherein creating the virtual USB device on the virtual USB hub comprises:
creating at least one of a vendor identification, device identification or descriptor for the virtual USB device; and
providing the at least one of the vendor identification, device identification or descriptor to the guest OS.

7. The method of claim 6, wherein providing the at least one of the vendor identification, device identification or descriptor to the guest OS allows access to the virtual USB device by the guest OS.

8. A system comprising:
a memory; and
a processing device, operatively coupled with the memory, to:
receive an indication corresponding to an initiation of a virtual machine;
in response to the initiation of the virtual machine, generate a virtual Universal Serial Bus (USB) device on a virtual USB hub executed by a host operating system (OS);
transmit the virtual USB device to a guest OS of the virtual machine;
intercept an instruction from the guest OS for the virtual USB device; and
cause the instruction to be provided from the guest OS, via the virtual USB hub, to the host OS.

9. The system of claim 8, wherein to generate the virtual USB device, the processing device is further to:
generate a virtual driver for the virtual USB device; and
transmit the virtual driver for the virtual USB device to the guest OS.

10. The system of claim 8, wherein the processing device is further to:
translate the instruction from a first programming language of the guest OS to a second programming language of the host OS.

11. The system of claim 8, wherein the processing device executes a virtual machine manager.

12. The system of claim 8, wherein to generate the virtual USB device on the virtual USB hub, the processing device is further to:
generate at least one of a vendor identification, device identification or descriptor for the virtual USB device; and
transmit the at least one of the vendor identification, device identification or descriptor to the guest OS.

13. The system of claim 12, wherein transmitting the at least one of the vendor identification, device identification or descriptor to the guest OS allows access to the virtual USB device by the guest OS.

14. A non-transitory computer-readable storage medium comprising executable instructions that, when executed by a processing device, cause the processing device to:

receive an instruction to create a communication channel between a guest operating system (OS) of a virtual machine and a host OS of a host system;
in response to receiving the instruction to create the communication channel, transmit, to a virtual Universal Serial Bus (USB) hub executed by the host OS, a first request to create a virtual USB device on the virtual USB hub;
provide the virtual USB device to the guest OS;
identify, by the processing device, an operation to be performed by the guest OS on the virtual USB device;
cause a second request, comprising the operation to be performed by the guest OS, to be provided from the guest OS to the virtual USB hub; and
cause the second request to be provided from the virtual USB hub to the host OS.

15. The non-transitory computer-readable storage medium of claim 14, wherein to transmit the first request to create the virtual USB device, the processing device is further to:
transmit the first request to create a virtual driver for the virtual USB device; and
provide the virtual driver for the virtual USB device to the guest OS.

16. The non-transitory computer-readable storage medium of claim 15, wherein providing the virtual driver to the guest OS facilitates an installation of the virtual driver on the guest OS.

17. The non-transitory computer-readable storage medium of claim 14, wherein the processing device executes a virtual machine manager.

18. The non-transitory computer-readable storage medium of claim 14, wherein the operation to be performed by the guest OS on the virtual USB device comprises at least one of a read operation, a write operation or an input/output control operation.

19. The non-transitory computer-readable storage medium of claim 14, wherein to create the virtual USB device on the virtual USB hub, the processing device is further to:
create at least one of a vendor identification, device identification or descriptor for the virtual USB device; and
provide the at least one of the vendor identification, device identification or descriptor to the guest OS.

20. The non-transitory computer-readable storage medium of claim 19, wherein providing the at least one of the vendor identification, device identification or descriptor to the guest OS allows access to the virtual USB device by the guest OS.

* * * * *